United States Patent [19]

Doherr et al.

[11] Patent Number: 5,094,408
[45] Date of Patent: Mar. 10, 1992

[54] ROTARY PARACHUTE

[75] Inventors: Karl F. Doherr; Dieter Münscher; Christos Saliaris, all of Brunswick; Roland Foitzik, Redlichstr, all of Fed. Rep. of Germany

[73] Assignee: Rheinmetall GmbH, Düsseldorf, Fed. Rep. of Germany

[21] Appl. No.: 625,488

[22] Filed: Dec. 11, 1990

[30] Foreign Application Priority Data

Dec. 19, 1989 [DE] Fed. Rep. of Germany ....... 3941806

[51] Int. Cl.$^5$ ............................................. B64D 17/02
[52] U.S. Cl. .................... 244/145; 244/142; 244/152
[58] Field of Search ............... 244/145, 142, 152, 147, 244/149, 139, 138 A, 140

[56] References Cited

U.S. PATENT DOCUMENTS

| | | | |
|---|---|---|---|
| 2,701,697 | 2/1955 | Ewing | 244/145 |
| 2,733,028 | 1/1956 | Epple | 244/145 |
| 2,737,358 | 3/1956 | Heinrich | 244/145 |
| 2,949,266 | 8/1960 | Sepp, Jr. | 244/145 |
| 3,350,040 | 10/1967 | Sims et al. | 244/145 |
| 3,403,876 | 10/1968 | Mitchell | 244/142 X |
| 3,655,152 | 4/1972 | Bonn et al. | 244/145 |
| 4,117,993 | 10/1978 | Palm et al. | 244/145 |
| 4,270,714 | 6/1981 | Jalbert | 244/152 X |
| 4,586,685 | 5/1986 | Kostelezky | 244/145 |

FOREIGN PATENT DOCUMENTS 2146167 3/1973 France .

Primary Examiner—Joseph F. Peters, Jr.
Assistant Examiner—Christopher Ellis
Attorney, Agent, or Firm—Spencer & Frank

[57] ABSTRACT

The parachute having a canopy composed of a plurality of radially arranged asymmetrical polygonal panels of the same shape, with, each panel being sewn only partially to its adjacent panel so that, in the fully deployed state, a plurality of air exit nozzles are formed in the carrying zone section of the parachute in the unsewn regions with the nozzles all acting in the same circumferential direction. The effect of each air exit nozzle is improved and stabilized with respect to guiding the flow of air in the tangential direction in that a trapezoidal area is attached to the edge or side of each panel in the unsewn region so as to overlap the adjacent panel. In addition, each panel is preferably provided with a horizontal or concentrically extending stabilization slit which is disposed in the transition region between the carrying zone section and the guide zone section of the canopy.

9 Claims, 1 Drawing Sheet

ROTARY PARACHUTE

CROSS-REFERENCE TO RELATED APPLICATION

This application claims the priority of Federal Republic of Germany, application no. P 39 41 806.5, filed Dec. 19th, 1989, and which is incorporated herein by reference.

BACKGROUND OF THE INVENTION

The present invention relates to a rotary parachute having a canopy made of individual panels arranged radially, and having the same polygonal asymmetric shape, with the panels being partially sewn together along their long or radially extending sides to form air exit openings which all act in the same direction to cause rotation during descent of the parachute.

A parachute of this type is disclosed in, for example, European Patent No. 0,105,462, which is a counterpart of U.S. Pat. No. 4,586,685.

Such parachutes, whose canopies include a carrying zone provided with nozzle shaped air exit openings and a drawn-in guide zone, are known to offer the possibility of impressing a rotational movement at a stable rate of rotation on the parachute, and on a load rigidly fastened thereto, while providing a stable descent. The configuration, function and further possible uses for such parachutes are described in detail in that European Patent.

However, it has been found that a parachute of this type, as defined in EP 0,105,462 (U.S. Pat. No. 4,586,685), is inclined to behave in a pendulum-like manner during the steady rotation/descent phase.

SUMMARY OF THE INVENTION

It is therefore an object of the invention to improve a parachute of this type in such a way that it descends in a stable manner without pendulum action during the steady rotary descending phase.

This is accomplished by a parachute according to a preferred embodiment of the invention including a canopy made of radially arranged individual panels all being cut in the same polygonal asymmetrical shape. The panels have their long sides partially sewn together in order to form air exit nozzles which all act to direct air in the same direction. The total surface area of each panel is composed of an essentially triangular first area forming a carrying zone section, an essentially trapezoidal second area forming a guide zone section, and an essentially trapezoidal third area forming an air exit nozzle. Each panel is sewn, in its carrying zone section, in a first section of its long side to a corresponding first section of the adjacent panel. Each panel is also sewn, in its guide zone section, in a second section of its long side to a corresponding section of the adjacent panel so that a longitudinal third section is left unsewn. In the sewn together adjacent panels the trapezoidal third area of the one panel overlaps the adjacent panel and lies on the outside of the latter.

With the inventive configuration of the parachute panels, particularly the trapezoidal area attached to the carrying or supporting zone section of each panel and overlapping the adjacent panel in the region of the air exit nozzle, it is accomplished that, once the parachute has been fully inflated, air exit nozzles are formed, with the above-mentioned trapezoidal area taking care that a stable nozzle is formed to improve the circumferential effect of the air exit nozzles and that the desired rate of rotation of the parachute is rapidly achieved.

Additionally, an advantageous feature of the parachute according to the invention includes a horizontal stabilization slit in the transition region between the guide zone section and the carrying zone section of each panel in order to provide for a more stable descending behavior during descent. Moreover, the aerodynamic performance data, such as rotation and resistance, are increased, with the diameter and speed of descent remaining the same.

According to further features of the parachute according to the invention, the carrying zone section of each panel is divided into at least two fields, which are sewn together and can be manufactured of different fabrics. Additionally, a horizontal tape can be sewn onto each panel in order to reinforce the carrying zone section and, when forming the carrying zone section of at least two fields, the horizontal tape is sewn on in the region of the connecting seam between the two fields.

DESCRIPTION OF THE PREFERRED EMBODIMENTS

Figure 1:
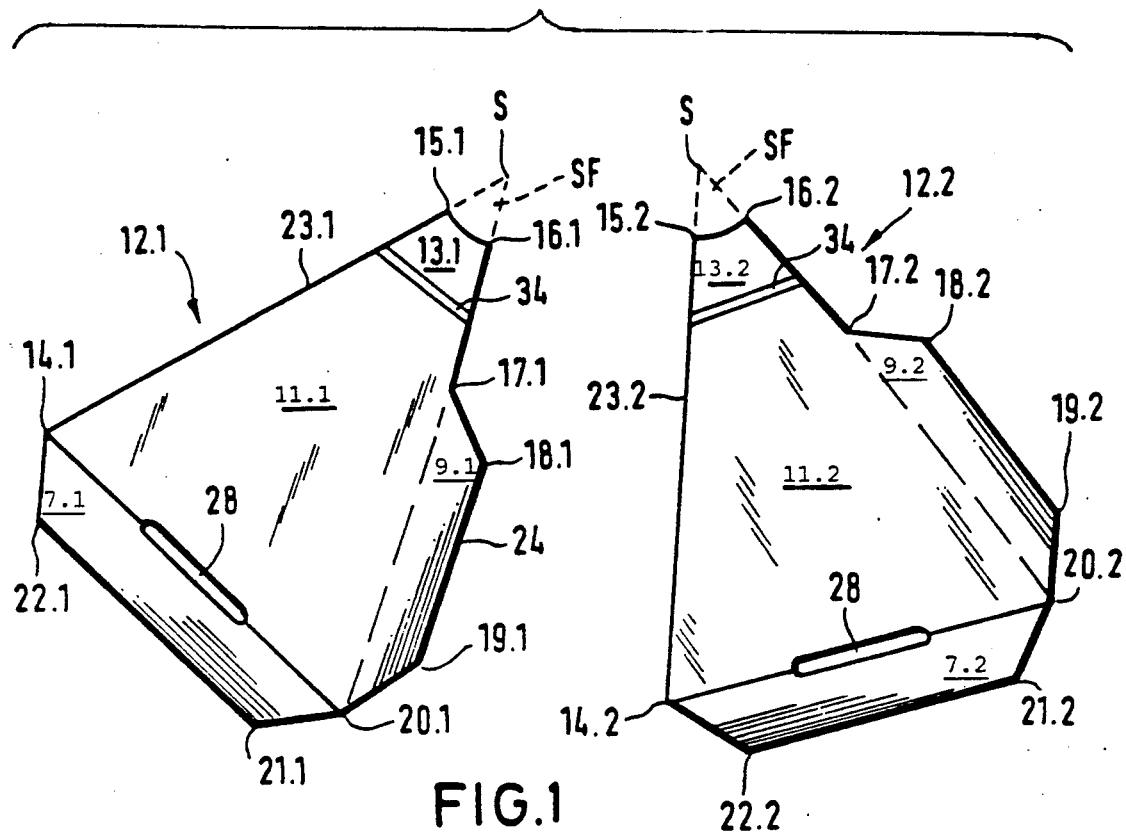
FIG. 1 is a plan view of two flat spread-out panels of a preferred embodiment of the parachute according to the invention.

FIG. 1 shows a first panel 12.1 for a parachute 10 (see FIG. 2) according to the invention with the panel 12.1 having an area defined by a polygonal curve. Panel 12.1 is composed of: a first area which is an essentially scalene triangle forming a carrying or supporting zone section having corner points 14.1, S, and 20.1; an essentially trapezoidal second area 7.1 having corner points 14.1, 20.1, 21.1, and 22.1, having its base attached at the base side formed by points 14.1 and 20.1 of the triangular area or carrying zone section and serving as a guide zone section; and an essentially trapezoidal third area 9.1 having its base attached to and extending along a portion of the longest side S-20.1 of the triangular carrying zone section to define an air exit nozzle, and having corner points 17.1, 18.1, 19.1, and 20.1. The side of the triangular carrying zone section between points S and 20.1 is longer than the side between points S and 14.1.

A second panel 12.2, shown in the right hand side of FIG. 1 as an example for all other panels, has a corresponding configuration, with the corner points of the polygonal curve and all parts being identified by similar reference numerals as for panel 12.1 except that for the second panel 12.2 they are given the identification "0.2". In the second panel 12.2, the side relationship S-20.2 > S-14.2 exists and, this side relationship applies for all other panels of parachute 10.

Figure 2:
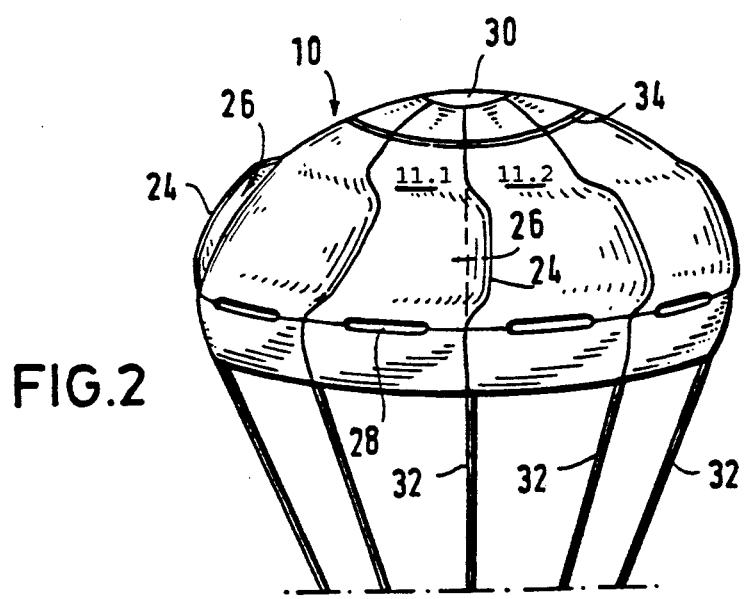
FIG. 2 is a perspective side view of a parachute composed of a plurality of panels of the type shown in FIG. 1.

The preferred embodiment of the parachute 10 according to the present invention shown in FIGS. 1 and 2 is a parachute which has a central apex opening 30. In this case, a small triangular area SF, having the corner points 15.1, S and 16.1, or 15.2, S and 16.2 is omitted in each respective panel 12.1 and 12.2.

In the first panel 12.1, the reference numeral 23.1 identifies a point on the long or radially extending side formed between corner points 14.1 and 15.1, with corner point 23.1 not being a corner point in the actual sense but rather a point which has the same distance from corner point 15.1 as the distance between corner point 17.1 and corner point 16.1. The same applies for polygon point 23.2 of second panel 12.2. The apex is marked S. An outer edge of panel 12.1 lying between corner points 18.1 and 19.1 is designated 24.

A circumferentially or horizontal extending stabilization slit 28 is provided in the line between corner points 14.1 and 20.1 that separates the guide zone section from the carrying zone section of first panel 12.1.

A horizontal or concentrically extending stabilization tape 34 is sewn to the upper portion of the carrying zone section of each panel 12.1, 12.2, respectively. This horizontal tape 34 is preferably employed to increase the strength of each panel 12.1, 12.2, and of course of all other panels in the region of apex S.

To complete parachute 10, the longest side or edge of the first panel 12.1 defined by corner points 16.1 and 20.1 is placed onto the shorter radially extending side or edge defined by corner points 15.2 and 14.2 of the second panel 12.2 so that corner point 16.1 comes to lie on corner point 15.2 and corner point 20.1 comes to lie on corner point 14.2, and the trapezoidal area 9.1 defined by corner points 17.1, 18.1, 19.1 and 20.1 overlaps the carrying zone section of the second panel 12.2. Then panels 12.1 and 12.2 are sewn together between points 16.1 (15.2, respectively) and 17.1 (23.2, respectively). Moreover, the edge of guide zone section 7.1 defined by corner points 20.1 and 21.1 of the first panel 12.1 is sewn to the edge of the corresponding guide zone section 7.2 defined by corner points 14.2 and 22.2 of the adjacent panel 12.2. Then all other panels are connected with one another in a similar manner to form the complete parachute 10. Additionally, the seams are finished and the raw edges are hemmed in a known manner, unless this has been done previously, and cords 32 (see FIG. 2) are fastened in a known manner.

Since adjacent panels 12.1, 12.2 are not sewn together between points 17.1 (23.2, respectively) and 20.1 (14.2, respectively), and since the length of panel 12.1 between points 17.1 and 20.1 is greater than the distance between points 23.2 and 14.2 of adjacent panel 12.2, a respective air exit nozzle will be formed. The edge 24 of trapezoidal area 9.1 serves as an outer edge of air exit nozzle 26 when parachute 10 is in use to guide the flow of air in a direction tangential to the outer surface of the canopy for improving and stabilizing the flight.

FIG. 2 shows the parachute 10 in a fully deployed state. Edge 24 of each air exit nozzle 26 of each panel is curved outwardly in flight by the outflowing air. In the view chosen for FIG. 2, the air flowing out of air exit nozzles 26 turns parachute 10 clockwise (when seen in the direction of flight). Stabilization slits 28 permit a slight amount of air to exit radially from parachute 10 and thus produce greater dynamic stability for parachute 10 in that they reduce the tendency of the parachute to pendulate; i.e., to exhibit pendulum-like movements.

In actual tests it has been found that, in a parachute according to the present invention that has a canopy diameter of Dc = 1.36 m, and in which the parachute panels 12.1, 12.2 are made of a woven textile fabric of the type called MIL-c-7350 Type I which has a fabric porosity of preferably no more than 100-150 $ft^3/min \cdot ft^2$ and a central apex opening 30 of a diameter of 50 mm, a resistance or drag coefficient of Cw = 0.68 and a rotation coefficient of Cr = 0.33 are obtained. These aerodynamic performance data are noticeably improved compared to a comparable parachute according to EP 0,105,462 and counterpart U.S. Pat. No. 4,586,685 discussed above. Given the cut of the parachute panels according to the invention, the resistance or drag of the deployed parachute in the preferred embodiment is increased while both decreasing the rate of descent and increasing the rotation effect. As a result of the thus higher internal pressure within the parachute canopy, a more stable canopy shape is formed so that improved air flow out of the canopy through the air exit openings is realized in the circumferential direction and, moreover, the dynamic stability of the parachute is improved.

For heavy loads and/or if demands for dynamic stability are high, it is appropriate to form the carrying zone section of each respective panel 12.1 and 12.2, of at least two fields 11.1, 13.1 and 11.2, 13.2, respectively, with the respective fields of each panel being of different fabrics. These fabrics may differ in their porosity, in material and/or in strength. Both fields 11.1, 13.1, and 11.2, 13.2 should be sewn together in the conventional manner, with preferably a horizontal tape 34 being attached in the region of the seam in order to increase the strength of the seam, as is shown in FIG. 1.

The parachute 10 according to the invention is particularly suited for establishing a stable final rate of rotation for the parachute during its descending flight independently of whether a higher rate of rotation has already been imposed on it when deployed, which higher rate requires deceleration, or whether the parachute is to build up to the final rate of rotation from an initial non-rotating state.

It will be understood that the above description of the present invention is susceptible to various modifications, changes, and adaptations, and the same are intended to be comprehended within the meaning and range of equivalents of the appended claims.

What is claimed is:

1. In a rotary parachute comprising a plurality of radially arranged individual panels each having the same polygonal asymmetrical shape, with said panels being sewn together to form said canopy including a plurality of air exit openings which all direct air in the same direction to cause rotation of said parachute; the improvement wherein:

the total surface area of each said panel includes an essentially triangular first area defining a carrying zone section, and essentially trapezoidal second and third areas defining a guide zone section and an air exit nozzle section, respectively, said first area having a circumferentially extending base side and first and second sides extending radially from a parachute apex with said first side being longer than said second side, said second area having a trapezoid base which is congruent with said base of said triangular first area, and said third area having a trapezoid base which extends along a portion of said first longer side of said triangular first area;

each said panel has its first longer side facing and sewn to said second side of an adjacent one of said panels while leaving said portion of said first longer side unsewn, thereby forming said air exit openings, and has an edge of its said second area sewn to a facing adjacent edge of said second area of the adjacent one of said panels; and said trapezoidal third area of each said panel overlaps a portion of said triangular first area of the adjacent one of said panels and is disposed adjacent the outer surface of said adjacent one of said panels to form said air exit nozzles.

2. A rotary parachute as defined in claim 1 wherein said portion of said first longer side of said triangular first area extends from said base of said first area.

3. A rotary parachute as defined in claim 1 wherein at least some of said panels are provided with respective concentrically extending slits formed along a portion of the respective said base of said first and second areas in a transition zone between said carrying zone and said guide zone sections.

4. A rotary parachute as defined in claim 3 wherein each of said panels is provided with said concentrically extending slit.

5. A rotary parachute as defined in claim 4 wherein said carrying zone section of each of said panels is formed of at least two fields.

6. A rotary parachute as defined in claim 5 wherein said fields are made of different fabrics.

7. A rotary parachute as defined in claim 5 wherein said at least two fields of each said panel are sewn together along concentrically extending edges to form a concentrically extending seam; and further comprising a concentrically extending tape sewn onto said canopy and overlying said concentrically extending seam.

8. A rotary parachute as defined in claim 4 further comprising a concentrically extending tape sewn onto said carrying zone section of each said panel.

9. A rotary parachute as defined in claim 4 wherein said parachute is open at its apex.

* * * * *